June 1, 1926.
J. SLEPIAN
1,586,714
CREST VOLTMETER
Filed Dec. 13, 1920
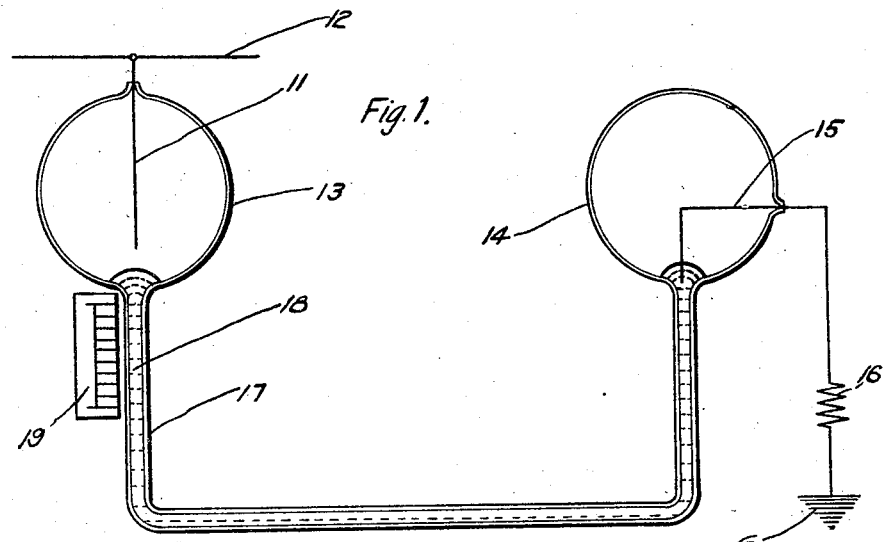
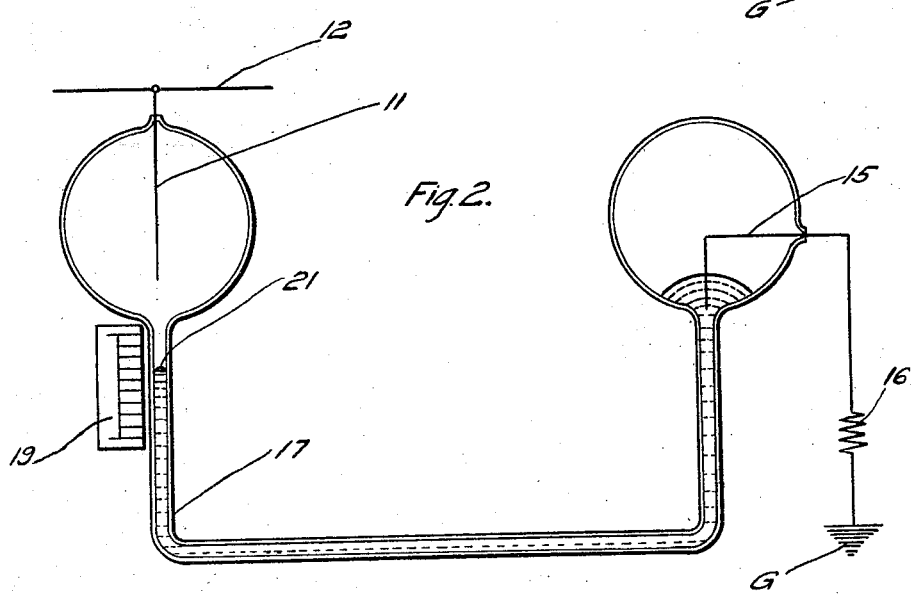
WITNESSES:
INVENTOR
Joseph Slepian
BY
ATTORNEY Patented June 1, 1926.

1,586,714

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

CREST VOLTMETER.

Application filed December 13, 1920. Serial No. 430,561.

The present invention relates to volt meters and has special relation to meters of this type adapted to indicate the crest or peak value of voltage.

One object of my invention is to provide a direct-reading instrument of the above-indicated character which shall be efficient and reliable in operation.

Another object of my invention is to provide a direct-reading instrument of the above-indicated character that shall be responsive to corona action.

Heretofore, the ionization of air or gases by the presence of corona has been utilized for determining the value of relatively high voltages, but these instruments, in the past, have not been of the direct-reading type. The instrument of the present invention is, however, of the direct-reading type and comprises two glass bulbs, preferably filled with an inert gas, in each of which is located an electrode. The bulbs are adapted to be connected to a capillary tube containing a body of mercury that extends into the interior of each bulb.

My invention may be best understood from the accompanying drawings, wherein—

Figure 1 is a diagrammatic view of the apparatus of the present invention illustrating relative positions when no current is applied thereto; and Fig. 2 is a diagrammatic view of the apparatus of Fig. 1, indicating relative positions when voltage is applied thereto.

In accordance with this invention, an electrode 11, preferably composed of tungsten, but which may be composed of some other suitable substance such as platinum, is connected directly to a conductor 12, the voltage between which and ground, is to be ascertained. The electrode 11 is located within a glass bulb 13, which is preferably filled with an inert gas, such as hydrogen or helium. A second glass bulb 14, likewise filled with an inert gas, is provided with an electrode 15 which may or may not be similar to the electrode 11 and is connected to ground through a resistor 16 the purpose of which will be hereinafter explained.

The two bulbs 13 and 14 are connected together by a tube 17 that is adapted to have disposed therein a column of mercury 18, or other current-carrying substance, which completely fills the tube and is shown as normally extending a slight distance into the interior of each of the bulbs 13 and 14. In bulb 13, the electrode 11 is separated from the top of the mercury column a distance which will depend upon several factors, such as the pressure of the gas within the bulb or the range of voltage values to be measured by the instrument. In bulb 14, the electrode 15 is, at all times, submerged in the mercury.

Disposed along the tube 17, beneath the bulb 13, is a scale 19 which is suitably calibrated to indicate the peak value of the applied voltages, in accordance with the mercury displacement about to be described.

When a sufficiently high voltage is applied between the electrode 11 and ground, a corona action is set up between the electrode and the top of the mercury column 18. This will cause a heating of the gas within the bulb 13 and will cause displacement of the mercury within the tube 17, as indicated, for example, in Fig. 2. This displacement will be in accordance with the value of the voltage applied between the electrode 11 and ground. This displacement will continue until corona no longer exists.

There are two factors tending to require an increasing voltage value necessary to give corona action. First, when starting, as indicated in Fig. 1, the corona action takes place between the electrode 11, constituting a comparatively fine point, and a comparatively broad surface or blunt head of mercury. As the mercury is forced into the tube 17 by the expansion of the gases within the bulb 13, the surface area of the mercury column is reduced to what may be regarded as a point, indicated at 21 in Fig. 2. It is well known that the voltage required to set up corona action between two points is nearly double that required to produce such action between a point and a blunt surface. Secondly, the increasing separation between the electrode 11 and the receding mercury column will require a rise in the corona voltage.

From the foregoing, it will be apparent that a time will occur when the electrode and the mercury column will be reduced to opposing points and be sufficiently separated to break the current gap therebetween. At this time, the mercury column will tend to advance toward a point where corona action will begin again. The point 21 will finally adjust itself to a position where no corona action will take place, except upon an advancement from this position. This position may then be taken as an indication of the peak voltage applied between the electrode 11 and ground. If a suitably calibrated scale is disposed along the capillary tube 17, adjacent to where the point 21 occurs, the peak or crest value of the applied voltage may be directly indicated by the scale, and the position of the point 21.

It may sometimes happen that an arc will occur between the electrode 11 and the mercury 18. The purpose of the resistor 16 is to take up the excess voltage of the arc to prevent a short circuit or other damage upon the circuit, the voltage of which is being determined.

From the foregoing description, it will be apparent that the present invention provides a direct-reading crest volt meter of the corona type which is simple in construction and efficient in operation.

I do not wish to be limited to the specific apparatus and circuits herein set forth, as many modifications thereof may be made within the spirit and scope of my invention. I desire, therefore, that only such limitations shall be imposed as are embodied in the appended claims.

I claim as my invention:—

1. In a high-voltage measuring device, the combination with a bulb having therein an electrode connected to one conductor of a circuit, the voltage value of which is to be measured, a second bulb also having therein an electrode connected to ground, and a tube connecting said bulbs, of a column of mercury disposed in said tube, adapted to be displaced in accordance with the voltage applied across said electrodes, and a scale calibrated to read the applied voltage in accordance with the displacement of said mercury column.

2. A measuring device comprising an enclosed vessel containing a gas and a liquid constituting a terminal of a circuit and a co-operating terminal of the circuit extending into the vessel in spaced relation to the liquid terminal, the construction and relation of parts operating to heat and expand the gas by corona action between the terminals and to displace the liquid in accordance with voltage applied to said terminals.

3. A measuring device comprising co-operating spaced terminals of a circuit having a difference of potential therebetween, one of which has a variable effective terminal area, and means for breaking down space-current discharge between the terminals including means for automatically varying said area in response to voltage changes between the terminals.

4. A measuring device comprising an enclosed tubular vessel of substantially U-shape having enlarged portions constituting chambers adjacent to its ends, a body of conducting liquid disposed in the tubular vessel between the chambers, co-operating terminals of a circuit, one of which extends into one of said chambers in spaced relation to said liquid and another of which extends into the other chamber in engagement with said liquid, and a body of gas in one of said chambers.

5. A measuring device comprising co-operating spaced terminals of a circuit having a difference of potential therebetween, one of which consists of a body of conducting liquid, and means for breaking down space-current discharge between the terminals including means for automatically varying the terminal surface area of the liquid terminal in response to voltage changes between the terminals.

6. A measuring-instrument structure comprising a plurality of chamber portions, electrodes therein for energization by a source of power of which a measurement is desired, a tubular portion connecting said chamber portions, and a conducting liquid in said tubular portion connected to one of said electrodes in spaced relation to another thereof to be affected in accordance with the voltage applied to said electrodes and to change the surface area of the liquid presented to said spaced electrode to break down corona action between said electrode and said surface.

7. A voltage-measuring device comprising an electrode adapted to have voltage applied thereto, an inert-gas-filled chamber within which said electrode is located, a means communicating with said chamber, current-carrying substance within said means, a second inert-gas-filled chamber communicating with said means, a second electrode connected to said substance in the second chamber, the heating action of said electrodes when voltage is applied thereto, causing an expansion of said gas to displace said substance, and a scale upon which said displacement may be read to indicate the value of the applied voltage.

8. In combination with a circuit, an enclosed vessel containing a body of gas, and a pair of terminals connected to the circuit and having portions disposed in spaced relation in the vessel, one of which portions embodies a body of conducting liquid, the construction and relation of elements automatically affecting the liquid to vary the intensity of space-current discharges between the terminals.

9. A measuring device comprising a sealed vessel of substantially U-tube shape having a gas-filled bulb at each end, a body of conducting liquid normally having its level adjacent to the entrances of the tube to the bulbs, an electrode connected to said liquid, and a second electrode disposed in spaced relation to the liquid in one of said bulbs to cause corona discharge for heating the gas and displacing the liquid.

10. A measuring device comprising an enclosed vessel containing a gas and a conducting liquid, a terminal of a circuit extending into the vessel in spaced relation to the liquid and another terminal of the circuit extending into the vessel in engagement with the liquid, the construction and relation of parts operating to heat and expand the gas and to so displace the liquid as to vary the surface area of the latter opposite said first terminal in accordance with the voltage of the circuit.

In testimony whereof, I have hereunto subscribed my name this 3rd day of December, 1920.

JOSEPH SLEPIAN.